United States Patent [19]

Shulman

[11] Patent Number: 4,500,681

[45] Date of Patent: Feb. 19, 1985

[54] THERMOPLASTIC BLEND OF POLYOLEFIN, ISOBUTYLENE-BACKBONE ELASTOMER AND ETHYLENE COPOLYMER

[75] Inventor: Cindy B. Shulman, Cliffside Park, N.J.

[73] Assignee: Exxon Research & Engineering Co., Florham Park, N.J.

[21] Appl. No.: 453,727

[22] Filed: Dec. 27, 1982

[51] Int. Cl.³ ............... C08L 23/22; C08L 23/10; C08L 31/04; C08L 33/08

[52] U.S. Cl. ............................ 525/222; 525/93; 525/192; 525/240; 525/232; 525/227

[58] Field of Search ............... 525/222, 227, 93

[56] References Cited

U.S. PATENT DOCUMENTS

| | | | |
|---|---|---|---|
| 4,126,649 | 11/1978 | Decroix | 260/897 B |
| 4,189,519 | 2/1980 | Ticknor | 428/476 |
| 4,273,893 | 6/1981 | Karim et al. | 525/227 |
| 4,277,578 | 7/1981 | Yoshimura et al. | 525/211 |
| 4,302,557 | 11/1981 | Yoshimura et al. | 525/211 |
| 4,311,808 | 1/1982 | Su | 525/222 |
| 4,336,212 | 6/1982 | Yoshimura et al. | 264/22 |

FOREIGN PATENT DOCUMENTS

| | | |
|---|---|---|
| 2844363 | 4/1979 | Fed. Rep. of Germany . |
| 0048233 | 4/1980 | Japan . |
| 0073740 | 6/1980 | Japan . |

OTHER PUBLICATIONS

"Polymer Chemistry of Synthetic Elastomers", Part I, Edited by J. P. Kennedy and Erik G. M. Tornqvist, pp. 291ff.

Primary Examiner—Carman J. Seccuro
Attorney, Agent, or Firm—H. L. Cohen

[57] ABSTRACT

Compositions of matter comprising a thermoplastic elastomeric blend of a polyolefin component, an isobutylene-backbone elastomer component, and a copolymer component of ethylene and an unsaturated ester of a lower carboxylic acid. Useful in the preparation of film, molded and extruded articles. The incorporation of an ethylene copolymer component, such as ethylene vinyl acetate, ethylene methyl acrylate, etc., results in compositions with the advantages of elastomer modified polyolefin blends, but which exhibit lower melt viscosity and improved processability.

23 Claims, No Drawings

THERMOPLASTIC BLEND OF POLYOLEFIN, ISOBUTYLENE-BACKBONE ELASTOMER AND ETHYLENE COPOLYMER

BACKGROUND OF THE INVENTION

This invention relates generally to the field of plastics blends or blends of polyolefin plastics with other plastics and elastomers and, optionally, thermal and environmental stabilizers, process aids, fillers, etc. Specifically, it is directed to blends of polyolefin plastics such as polypropylene, polypropylene reactor copolymer, polybutylene, low density polyethylene, linear low density polyethylene, and high density polyethylene with a polyisobutylene-backbone elastomer component such as polyisobutylene, butyl rubber and halogenated butyl rubber, and a copolymer component of ethylene and an unsaturated ester of a lower carboxylic acid. The compositions comprising these essential blend components can optionally contain process aids, antiblock additives, thermal and environmental stabilizers, such as antioxidants, antiozonants, U.V. stabilizers, etc., fillers, extenders, pigments, foaming agents, etc. The final compositions are useful in the production of films, filaments, rods, molded and extruded shaped articles.

Isobutylene-backbone elastomers, for example, polyisobutylene elastomers, are commonly used in industry to modify polyolefins for improvement in low temperature properties, impact strength, toughness, tear resistance and flexibility; concentrations are typically in the range of 10 to 40 weight percent polyisobutylene. As the elastomer concentration is increased the benefits of the rubber are more apparent, however, the melt viscosity of the polymer blend is increased to such an extent that high pressures and uneconomically low throughput rates result.

Limited teachings are available in the prior art which disclose various plastics blend compositions, but individually and collectively they fail to provide the advance which is disclosed by the inventor herein:

U.S. Pat. No. 4,311,808 to Su relates to a composition comprised of: polyisobutylene, an ethylenepropylene copolymer, and ethylene vinyl acetate copolymer (EVA). The EVA copolymer contains up to 20% vinyl acetate. The composition may be used for forming films.

Japanese Pat. No. 73,740 discloses a polymeric composition comprised of EVA, ethylene-α-olefin copolymer, and a polyolefin such as crystalline polypropylene, high density polyethylene and polybutene-1.

Japanese Pat. No. 48,233 relates to a complex process for producing a hot melt sealant which, at one stage involves a polymeric composition comprised of EVA, polyisobutylene, or ethylene-propylene copolymer.

A German Pat., No. 2,844,363 discloses a polymeric blend of low density polyethylene and/or EVA, ethylene-α-olefin copolymer, and a polyolefin such as crystalline polypropylene, high density polyethylene, and/or polybutene-1. Such a blend is used in the manufacturing of shrink film. This patent is based on an original Japanese disclosure and is also available as three related U.S. Pat. Nos.: 4,336,212; 4,302,557 and 4,277,578 to Yoshimura et al.

The United States patent to Decroix, U.S. Pat. No. 4,126,649, relates to a polymeric composition comprised of: EVA and polybutene-1 or butene-ethylene copolymer.

A patent to Ticknor, U.S. Pat. No. 4,189,519, relates to a resin blend of EVA and polybutylene (polybutene-1) applied to a substrate of high density polyethylene or nylon.

U.S. patent application Ser. No. 362,103 discloses blends of polyolefin plastics with elastomeric plasticizers. The elastomeric plasticizer comprises polyethylene or a copolymer of ethylene and an unsaturated ester of a lower carboxylic acid, olefinic elastomer and hydrocarbon oil. The use of the elastomeric plasticizer is shown to be advantageous in handling and processing the compositions and in achieving good dispersion of the ingredients useful for the preparation of film.

SUMMARY OF THE INVENTION

In accordance with the present invention, improved compositions of matter have been discovered for use in the preparation of film and other useful articles including filaments, rods, and molded and extruded shaped articles. The compositions are thermoplastic elastomeric blend compositions comprising (a) a polyolefin component, (b) an isobutylene-backbone elastomer component, and (c) a copolymer component of ethylene and an unsaturated ester of a lower carboxylic acid. The composition exhibits the improved performance of elastomer modified polyolefins at a reduced viscosity.

DESCRIPTION OF THE PREFERRED EMBODIMENTS

The polyolefin component useful in the blend composition includes polypropylene, polypropylene reactor copolymer, high density polyethylene, linear low density polyethylene, low density polyethylene, polybutylene and mixtures thereof. The polypropylene can be a highly crystalline isotactic or syndiotactic polypropylene. Also, the polypropylene can be a copolymer, referred to as a polypropylene reactor copolymer, either random or block copolymer, containing minor amounts of an alpha-olefin comonomer of 2 to 16 carbon atoms. The level of comonomer which can be utilized is about 1 to about 20 weight percent, preferably about 2 to about 18, most preferably about 2 to about 15; a preferred comonomer is ethylene. The density of polypropylene can be from about 0.800 to about 0.900 g/cc.

High density polyethylene (HDPE) useful as the polyolefin plastic to be blended has a density of about 0.941 to about 0.965 g/cc. High density polyethylene is an established product of commerce and its manufacture and general properties are well known in the art. Typically, HDPE has a relatively broad molecular weight distribution, characterized by the ratio of weight average to number average molecular weight, of from about 20 to about 40. HDPE for use in film can have a melt index (ASTM D1238, Method E) of from about 0.03 to about 5.0 g/10 min. and a density of from about 0.941 to about 0.965 g/cc.

Polybutylene, which is also useful in this invention, as the polyolefin plastic, is a term which generally refers to both poly (1-butene) homopolymer and the copolymer with, e.g., ethylene, propylene, pentene-1, etc. Particularly useful in this invention is the ethylene copolymer. Polybutylene is manufactured via stereospecific ZieglerNatta polymerization of the monomer(s). Commercially useful products are of high molecular weight and isotacticity. A variety of commercial grades of both homopolymer and ethylene copolymer are available with melt indices that range from about 0.3 to about 20 g/10 min.; commercial ethylene copolymer grades have a melt index of from about 1 to about 2, although it is to be expected that a wider range would be acceptable, e.g., from about 0.5 to about 5 or higher, depending on the intended application.

Linear low density polyethylene (LLDPE) is a relatively new class of low density polyethylene characterized by little, if any, long chain branching, in contrast to conventional low density polyethylene. The processes for producing LLDPE are well known in the art and commercial grades of this polyolefin plastic are available. Generally, it is produced in gas-phase fluidized bed reactors or liquid-phase solution process reactors; the former process can be carried out at pressures of about 100 to 300 psi and temperatures as low as 100° C. Polymers can be made in the gas phase with melt indices and densities over the full commercial range and with molecular weight distributions from very narrow to very broad. Typically, the level of polyolefin plastics employed is from about 95 to about 15 weight percent of the composition, preferably about 92 to about 17 weight percent, most preferably about 90 to about 20 weight percent.

Low density polyethylene (LDPE) includes polymers with densities of from about 0.910 to about 0.925 g/cc. Low density polyethylene is typically produced in a high pressure process which results in a branched product containing many long and short chain side branches, approximately 10 to 20 per 1000 carbon atoms. As a consequence of branching the polymer is crystalline to the extent of about 50 to 60 percent. The molecular weight distribution of LDPE varies with the process used to produce it. Typical values for the ratio of weight average to number average molecular weight are 5 to 25 for product produced in a tubular reactor and 5 to 75 for a product from an autoclave reactor. The melt index of the low density polyethylene can vary from about 0.1 to about 10.

The second initial component of the blend composition is an isobutylene-backbone elastomer. Elastomers useful in this invention include polyisobutylene, copolymers of isobutylene generally known as butyl rubber and halogenated butyl rubber, such as chlorinated, brominated and chlorobrominated butyl rubber.

Butyl rubber is a vulcanizable rubbery copolymer containing from about 85 to 99.5 percent combined isoolefin having from 4 to 8 carbon atoms and 0.5 to 15 percent combined conjugated diolefin having from 4 to 8 carbon atoms. Such copolymers and their preparation are well known, and generally the isoolefin is a compound such as isobutylene and the diolefin is a compound such as butadiene or isoprene. Halogenated butyl rubber is also well known; chlorinated and brominated butyl rubber generally contain at least about 0.5 weight percent combined halogen and up to about 1 atom of halogen per double bond in the copolymer; chlorobrominated butyl rubber generally contains from about 1.0 to about 3.0 weight percent bromine and from about 0.05 to about 0.5 weight percent chlorine. Butyl and halogenated butyl elastomers useful in the practice of this invention include those with viscosity average molecular weights of about 200,000 to 600,000; preferably about 250,000 to about 500,000; most preferably about 300,000 to about 450,000.

Polyisobutylene (PIB) elastomer is an article of commerce available as various molecular weight products. Elastomeric PIB is prepared using Friedel-Crafts catalysts, e.g., $AlCl_3$, $BF_3$, $AlEtCl_2$, etc., at low temperatures, e.g., at temperatures below about $-80°$ C. Polyisobutylene manufacture is well known in the art and is described in the patent literature and in the textbook, "Polymer Chemistry of Synthetic Elastomers," Part I, Edited by J. P. Kennedy and E. G. M. Tornqvist, (Interscience Publ. 1968), pages 291 ff. Polyisobutylene useful in the blend composition has a Staudinger molecular weight of about 50,000 to about 150,000, preferably about 55,000 to about 145,000, most preferably about 60,000 to about 140,000; for example about 80,000 to about 100,000. Commercial grades of polyisobutylene are available in various molecular weight ranges, e.g., Staudinger molecular weight of about 64,000–81,000, about 81,000–99,000, about 99,000–117,000, about 117,000–135,000 (commercial grade designations Vistanex® MM L-80, MM L-100, MM L-120, and MM L-140, respectively; Exxon Chemical Company).

The copolymer component of ethylene and an unsaturated ester of a lower carboxylic acid includes copolymers of ethylene with vinyl acetate or alkyl acrylates, for example, methyl acrylate and ethyl acrylate. The polyethylene copolymers to be employed generally contain from about 50 to about 99 weight percent ethylene, preferably about 55 to about 96 weight percent ethylene, most preferably about 65 to about 93 weight percent ethylene.

In addition to the essential ingredients of the overall thermoplastic elastomeric composition as previously defined, optional ingredients can be incorporated into the composition in order to achieve various cost and/or performance objectives in specific end-use applications. For example, one can use such materials as process aids (e.g., stearic acid), lubricants (e.g., oleamide), antiblocking aids, stabilizers and antioxidants, foaming agents, fire retardants, fillers (including mineral fillers), colorants and pigments.

Preparation of compositions of this invention, can be achieved in several different ways. The essential and optional components are brought into intimate contact by, for example, dry blending these materials and then passing the overall composition through a compounding extruder. Alternatively, the ingredients are fed directly to a mixing device such as a compounding extruder, high shear continuous mixer, two roll mill, an internal mixer such as a Banbury, etc. The optional ingredients previously described can be added to the composition during this mixing operation. A preferred method of mixing to ensure intimate dispersion of the isobutylene-backbone elastomer is to mix in two stages. In a first stage a concentrate (or masterbatch) is prepared comprising the isobutylene-backbone elastomer mixed with an equal or smaller amount of one or both of the other polymeric components, i.e., the polyolefin and/or ethylene copolymer, in a high shear mixer such as a Banbury. In a second stage, the concentrate and all remaining ingredients are mixed under high shear. It is also possible to mix the second stage in a low shear environment, for example, in the extruder section of a film line or in an injection molding machine. Overall, the objective is to obtain the appropriate dispersion of all ingredients and this is readily achieved by inducing sufficient shear and heat to cause the plastics component(s) to melt. However, time and temperature of mixing should be controlled as is normally done by one skilled in the art so as to avoid molecular weight degradation and unnecessary volatilization of ingredients. Depending on the polyolefin plastics component(s)

employed, a melt temperature range of about 250° F. to about 550° F. could be expected. Where extruder mixing is employed the length to diameter (L/D) ratio of the screw should be at least 10/1, preferably at least 15/1.

Based on experimental observation, including scanning electron micrographs of blends employing polypropylene, polyisobutylene and ethylene vinyl acetate (as will be described in further detail in the examples), it appears that the ethylene copolymer component acts as a polymeric filler extending the isobutylene-backbone elastomer phase of the polymer matrix. The use of the ethylene copolymer is unique in that it does not detract from the benefits imparted by the isobutylene-backbone elastomer to the polyolefin-elastomer matrix.

A thermoplastic elastomeric blend composition useful in the present invention comprises:
 (a) from about 20 to about 65 weight percent of the polyolefin component, preferably from about 25 to about 60 weight percent, more preferably from about 35 to about 55 weight percent;
 (b) from about 20 to about 60 weight percent isobutylene-backbone elastomer, preferably from about 25 to about 55 weight percent, most preferably from about 30 to about 50 weight percent; and
 (c) from about 7 to about 40 weight percent ethylene copolymer, preferably from about 10 to about 35 weight percent, most preferably from about 13 to about 25 weight percent.

The concentrations expressed are based on the total weight of the three polymeric components, polyolefin, isobutylene-backbone elastomer and ethylene copolymer. When optional ingredients are incorporated into the blend in order to achieve specific processing or end-use performance goals, their concentration would be at functional levels well known to those skilled in the art, typically: up to about 5 weight percent stabilizers, antioxidants, colorants, pigments, foaming agents, etc.; up to about 20 weight percent fire retardants; and up to about 30 weight percent filler, e.g., mineral filler. If optional ingredients are used, their concentration is calculated based on the total composition, including the optional ingredient(s).

For example, a blend composition originally containing 40 weight percent polyethylene, 40 weight percent polyisobutylene and 20 weight percent ethylene vinyl acetate is to be modified to contain 25 weight percent filler. The polymeric components would then comprise 75 weight percent of the total composition and each polymeric component would be present at 75 percent of its original concentration, i.e., polyethylene—30 weight percent, polyisobutylene—30 weight percent, and ethylene vinyl acetate—15 weight percent. From a practical point of view, the use of low concentrations of optional ingredients would not necessitate adjustment of the concentrations of the polymeric components; this is shown in the examples herein.

Following preparation of the composition the blend can be used to manufacture film, e.g., blown and cast film. It can also be used with other types of equipment commonly used to produce film, e.g., the tubular water bath extrusion process, blown or cast co-extrusion process, extrusion coating onto another substrate, etc. In addition to film, the compositions disclosed herein can be used to prepare rods, sheets, profiles, molded and extruded shaped articles, and, generally, products made by injection molding, blow molding, sheet forming, thermoforming, extruding etc. Certain end-use applications may not require the use of various optional ingredients, so that, for example, film can readily be produced from compositions disclosed herein which are free of filler; particularly preferred are plasticizer-free compositions. Products are produced from the thermoplastic blend compositions disclosed herein which exhibit the advantageous properties characteristic of a blend containing a high concentration of elastomer, such as flexibility and softness, achieved without significantly increasing the viscosity of the composition to levels normally associated with the use of high concentrations of elastomer.

The scope and significance of the present invention may be more fully understood with reference to the following specific examples thereof.

EXAMPLE 1

Cast film was prepared from the following blend compositions:

|  | (1) | (2) |
|---|---|---|
| Polypropylene[a] | 50 | 50 |
| Polyisobutylene[b] | 50 | 35 |
| Ethylene vinyl acetate copolymer[c] | — | 15 |
| Antioxidant[d] | 0.2 | 0.2 |
| Antiblock agent[e] | 0.7 | 0.7 |
| Slip agent[f] | 0.2 | 0.2 |

[a]Grade: Escorene ® PD4062 (4 melt flow rate); manufactured by Exxon Chemical Co.
[b]Grade: Vistanex ® MM L-100; manufactured by Exxon Chemical Co.
[c]Grade: Escorene ® LD401, 9 weight % vinyl acetate, 2 melt index; manufactured by Exxon Chemical Co.
[d]Irganox ® 1076; manufactured by Ciba-Geigy.
[e]Syloid ® 221; manufactured by W.R. Grace & Co.
[f]Armoslip ® EXP; manufactured by Noury Chemical Corp.

The blend compositions were prepared as follows: a 2:1 masterbatch of polyisobutylene and polypropylene was mixed in a Banbury for approximately 4 minutes. In a second Banbury mix the masterbatch was combined with the remaining ingredients, mixed for approximately 3 minutes, and underwater pelletized to allow for easy handling in subsequent processing.

The cast films were prepared on a commercial cast film line of the type commonly used to cast polyolefin films. Specifically, a 3½ inch extruder with a 24/1 L/D ratio of the screw was used with a 20 mil die gap and a water cooled chill roll at about 60° F. Film was produced on 20 inch width rolls at a gauge of approximately 3.5 mils.

Properties of the films were measured with the following results:

| Property | Composition | |
|---|---|---|
|  | (1) | (2) |
| Melt Flow Rate @ 230° C. grams/10 minutes | 0.6 | 1.4 |
| Extruder Pressure, psi | 4400 | 3600 |
| Calculated Density, g/cc | 0.91 | 0.91 |
| Average Gauge, mils | 3.2 | 3.8 |
| Tensile Strength, psi |  |  |
| @ Yield Machine Direction (MD) | 1500 | 1700 |
| Transverse Direction (TD) | 1100 | 1300 |
| @ Break MD | 4300 | 4500 |
| TD | 3200 | 3000 |
| Elongation, % |  |  |
| @ Yield MD | 10 | 11 |
| TD | 7 | 10 |
| @ Break MD | 510 | 480 |
| TD | 650 | 630 |
| 1% Secant Modulus, psi |  |  |

-continued

| Property | Composition (1) | (2) |
|---|---|---|
| MD | 48,000 | 47,000 |
| TD | 30,000 | 39,000 |
| Elmendorf Tear, g/mil | | |
| MD | 260 | 220 |
| TD | 620 | 670 |
| Dart Drop | | |
| Total Energy, 66 inch drop, in-lb./mil | 50 | 37 |
| Coeffiecient of Friction | | |
| Top/Top (Chill Roll Side) | 1.0 | 0.8 |
| Back/Back | 1.4 | 0.9 |

The melt flow rate of composition (2) is higher, resulting in lower extruder pressures during processing while the tensile strength, elongation, modulus, and tear strength are equivalent. There is some difference in dart impact strength, however a dart impact total energy of 37 in-lb/mil is generally recognized in the art as an extremely tough material. The addition of EVA at the expense of PIB also improved pellet stability and lowered the coefficient of friction properties of the film.

EXAMPLE 2

Using the same mixing procedures as described in Example 1, blown film was prepared from the following blend compositions:

| | (1) | (2) |
|---|---|---|
| Polypropylene[a] | 50 | 35 |
| Polyisobutylene[b] | 50 | 50 |
| Ethylene vinyl acetate copolymer[c] | — | 15 |
| Antioxidant[d] | 0.2 | 0.2 |
| Slip agent[e] | 0.4 | 0.4 |

[a]Escorene PD 4062
[b]Vistanex MM L-100
[c]Escorene LD 401
[d]Irganox 1076
[e]Armoslip EXP Blown film was prepared on a 1½ inch line of the type commonly used in the art to manufacture blown polyolefin films. A conventional low density polyethylene die having a 3 inch diameter and a 30 mil die gap was used. The extruder temperature profile ranged from 380° F. in the feed zone to 420° F. at the die. A blow up ratio of 3:1 and a layflat width of 14¼ inches was used to produce 1.5 mil film.

Properties of the compositions and films were measured with the following results:

| Property | Composition (1) | (2) |
|---|---|---|
| Melt Flow Rate @ 230° C. grams/10 minutes | 0.7 | 0.7 |
| 1½" Blown Film Line | | |
| Extruder Pressure, psi | 3900 | 3400 |
| Bubble Stability @ 1.5 mils | wavy | good |
| Bubble Stability @ 1 mil | film could not be produced due to uncontrollable bubble | good |
| Elmendorf Tear, g/mil | | |
| 1.5 mil blown film, MD | 340 | 440 |
| TD | 340 | 470 |

When processing a polyolefin blend containing 50% PIB/50% PP on a blown film line the bubble stability and draw down are markedly improved with the addition of EVA to the matrix at the expense of PP. The film containing EVA can be drawn down to 1 mil while the 50/50 PIB/PP blend did not produce a film at 1 mil because of excessive waviness causing unacceptable layflat width and gauge variance. The tear resistance of the PIB/EVA/PP film is also superior. The feel of the two films are distinctive: the EVA-containing blend feels rubbery and is rustle free while the PP/PIB film feels and sounds (i.e. when crinkled) plastic-like. Upon creasing or stressing the two films composition (1) stress whitened while composition (2) did not. The properties and rubber like nature of the three component blend containing 50% PIB resembles more closely a PP/PIB compound containing approximately 65% PIB, which would be extremely difficult to process into blown film.

EXAMPLE 3

Cast film was prepared from components and using procedures described in Example 1. Samples of film were freeze fractured and extracted with hexane and examined with a scanning electron microscope. The two blend compositions each contained 60 weight percent polyisobutylene, but in one compound the remainder of the composition (40 weight percent) was polypropylene whereas the other contained 15 weight percent ethylene vinyl acetate copolymer and 25 weight percent polypropylene. The three component system of this invention resulted in a co-continuous matrix of polypropylene and polyisobutylene whereas the two component composition had discrete particles of polyisobutylene dispersed in a continuous phase of polypropylene.

EXAMPLE 4

Blend compositions were prepared in a two stage Banbury mix as in Example 1 according to the following formulations:

| | (1) | (2) | (3) | (4) |
|---|---|---|---|---|
| Polyethylene (Melt index 1.0) | 63.3 | 40.3 | 40.3 | 40.3 |
| Polyisobutylene[a] | 18 | 30 | 30 | 30 |
| EVA (18% VA, 150 MI) | — | 11 | 5.5 | — |
| EVA (28% VA, 3 MI) | — | — | 5.5 | — |
| EVA (40% VA, 70 MI) | — | — | — | 11 |
| Calcium carbonate filler | 16.5 | 16.5 | 16.5 | 16.5 |
| Process aid | 2.0 | 2.0 | 2.0 | 2.0 |
| Antioxidant | 0.2 | 0.2 | 0.2 | 0.2 |

[a]Grade: Vistanex MM L-100.

The blend compositions were used to prepare film on a 1½ inch blown film line and to injection mold specimens with the following results:

| Property | (1) | (2) | (3) | (4) |
|---|---|---|---|---|
| Sterling 1½" Blown Film Line | | | | |
| Extruder pressure, psi | 3400 | 2900 | 3400 | 3200 |
| Minimum film gauge, mils | 0.5 | 0.5 | 0.5 | 0.5 |
| Injection Molded Specimens | | | | |
| Hardness, Shore A, 10 sec | 95 | 87 | 88 | 85 |
| Flexural Secant Moldulus, psi | 21,000 | 9500 | 9000 | 7000 |
| 100% Modulus, psi | 1900 | 1100 | 1200 | 1000 |
| BRABENDER | 1825 | 1315 (28) | 1550 (15) | 1475 (19) |

| -continued | | | | |
|---|---|---|---|---|
| Property | (1) | (2) | (3) | (4) |
| VISCOSITY$^{(a)}$ | | | | |

$^{(a)}$"Meter-grams torque at 20 RPM, 240° F.; values in parentheses are percent reduction relative to the reference composition 1.

These results demonstrate that by use of the invention disclosed herein polyethylene can be modified with high concentrations of an isobutylene-backbone elastomer with unanticipated reductions in viscosity and without loss of processability in the preparation of blown film and injection molded articles.

What is claimed is:

1. A thermoplastic elastomeric blend composition comprising:
   (a) from about 20 to about 65 weight percent isotactic polypropylene or polypropylene reactor copolymer containing about 1 to about 20 weight percent of an alpha-olefin comonomer or mixtures thereof,
   (b) from about 20 to about 60 weight percent of an isobutylene-backbone elastomer component, and
   (c) from about 7 to about 40 weight percent of a copolymer component of ethylene and an unsaturated ester of a lower carboxylic acid.

2. The composition of claim 1 wherein said isobutylene-backbone elastomer is selected from the group consisting of polyisobutylene, butyl rubber, halogenated butyl rubber and mixtures thereof.

3. The composition of claim 2 wherein said butyl rubber is an isobutylene isoprene copolymer.

4. The composition of claim 2 wherein said polyisobutylene has a Staudinger molecular weight of from about 50,000 to about 150,000.

5. The composition of claim 1 wherein said unsaturated ester of a lower carboxylic acid is selected from the group consisting of vinyl esters and alkyl acrylates.

6. The composition of claim 5 wherein said vinyl ester comprises vinyl acetate.

7. The composition of claim 5 wherein said alkyl acrylate is selected from the group consisting of methyl acrylate and ethyl acrylate.

8. The composition of claim 6 wherein said vinyl acetate is present at a concentration of from about 9 to about 45 weight percent.

9. The composition of claim 1 wherein (a) is present from about 25 to about 60 percent by weight.

10. The composition of claim 1 wherein said isobutylene-backbone elastomer is present from about 25 to about 55 percent by weight.

11. The composition of claim 1 wherein said ethylene copolymer component is present from about 10 to about 35 percent by weight.

12. The composition of claim 1 wherein said polypropylene reactor copolymer includes ethylene from about 1 to about 20 weight percent.

13. The composition of claim 11 wherein said ethylene copolymer is ethylene vinyl acetate.

14. The composition of claim 7 wherein said isobutylene-backbone elastomer is polyisobutylene.

15. The composition of claim 14 wherein said polyisobutylene is present from about 25 to about 55 percent by weight.

16. The composition of claim 14 wherein (a) is polypropylene.

17. The composition of claim 16 wherein said polypropylene is present from about 25 to about 60 percent by weight.

18. A film produced from the composition of claim 1.

19. A film produced from the composition of claim 17.

20. An extruded article produced from the composition of claim 1.

21. An extruded article produced from the composition of claim 17.

22. A molded article produced from the composition of claim 1.

23. A molded article produced from the composition of claim 17.

* * * * *